(12) United States Patent
Liu et al.

(10) Patent No.: US 7,133,422 B2
(45) Date of Patent: Nov. 7, 2006

(54) IMPLEMENTING ENHANCED DISTRIBUTED COORDINATING FUNCTION (EDCF) WITH A SINGLE HARDWARE BACKOFF COUNTER

(75) Inventors: Yonghe Liu, Dallas, TX (US); Matthew B. Shoemake, Allen, TX (US); Sid B. Schrum, Durham, NC (US)

(73) Assignee: Texas Instruments Incorporated, Dallas, TX (US)

( * ) Notice: Subject to any disclaimer, the term of this patent is extended or adjusted under 35 U.S.C. 154(b) by 1003 days.

(21) Appl. No.: 10/066,431

(22) Filed: Jan. 31, 2002

(65) Prior Publication Data

US 2003/0145095 A1    Jul. 31, 2003

(51) Int. Cl.
  *H04J 3/06* (2006.01)
(52) U.S. Cl. ............................................. 370/503
(58) Field of Classification Search ............ None
  See application file for complete search history.

(56) References Cited

U.S. PATENT DOCUMENTS

| | | | | |
|---|---|---|---|---|
| 5,268,899 A | * | 12/1993 | Brown | 370/448 |
| 6,349,388 B1 | * | 2/2002 | Russell | 713/502 |
| 6,965,942 B1 | * | 11/2005 | Young et al. | 709/232 |
| 2002/0085582 A1 | * | 7/2002 | Kim | 370/445 |
| 2002/0154653 A1 | * | 10/2002 | Benveniste | 370/447 |
| 2002/0163933 A1 | * | 11/2002 | Benveniste | 370/465 |

* cited by examiner

*Primary Examiner*—Doris H. To
*Assistant Examiner*—Robert W. Wilson
(74) *Attorney, Agent, or Firm*—Steven A. Shaw; W. James Brady; Frederick J. Telecky, Jr.

(57) ABSTRACT

A method for implementing a plurality of backoff counters on a hardware backoff counter for use in implementing a prioritized message transmission network is presented. A message with a smallest backoff time is selected and placed into the hardware backoff counter. When the hardware backoff counter expires, the message is transmitted. Whenever the communications medium becomes busy, the backoff time for every message is updated.

39 Claims, 5 Drawing Sheets

IMPLEMENTING ENHANCED DISTRIBUTED COORDINATING FUNCTION (EDCF) WITH A SINGLE HARDWARE BACKOFF COUNTER

FIELD OF THE INVENTION

This invention relates generally to information networks and more particularly to information networks that partition information into different classes and prioritizes the different classes, depending upon desired performance goals.

BACKGROUND OF THE INVENTION

Communications networks use a transmission medium to transmit information in the form of computer data, voice, music, video, etc., from one station to another. The communications medium may be a wired link, a fiber optic link, or a wireless link. The wireless link may include, but is not limited to, radio frequency, infrared, laser light, and microwave. The network may, in fact, use a combination of different communications links.

With the exception of a small number of networks that use dedicated communications links between each station, most information networks use a shared transmission medium to carry the transmitted information. Examples of information networks using a shared transmission medium include: Ethernet, token ring, and wireless Ethernet (IEEE 802.11).

However, by sharing a communications medium between multiple stations, there are situations (extended busy times) that arise when stations are required to wait a significant amount of time before they are able to transmit their data. Additionally, situations (collisions) exist when simultaneous transmissions from different stations occur and result in the mutual destruction of the transmissions. Such situations are undesirable in providing quality of service (QoS) to multimedia data transfers and in making efficient use of scarce spectrum on a wireless medium.

For some applications, such as voice telephony, video tele-conferencing, and other real-time, bi-directional, interactive applications, extended transfer times can severely and rapidly degrade the performance of the applications to a level that is unacceptable. For example, in voice telephony applications, if the delay between one user speaking and another user listening is greater than a few milliseconds, the delay becomes noticeable to the users and the users' satisfaction level for the telephone connection begins to drop.

One way to ensure that applications requiring a low maximum network latency receive the level of service that they require is to implement some form of QoS transfers of data traffic between stations. In many networks with QoS transfers, communications traffic in a network are partitioned into multiple categories and the categories are parameterized or prioritized according to their specific performance requirements. For example, traffic carrying a telephone conversation between two users will be given a higher priority than traffic carrying data for a file transfer between two computers. By creating categories for the traffic, parameterizing and prioritizing the different categories and ensuring that traffic of higher QoS demands or higher priority receives better service, these networks offer and meet performance guarantees.

In wireless local area networks (LANs) specified by the IEEE 802.11 technical standard, each different category of network traffic is required to contend for access to the shared medium. The technical standard specifies a technique using a randomly selected backoff time and a backoff counter to ensure fair access to the shared medium. However, because there are many possible categories of network traffic and the backoff counter requires frequent updates, hardware rather than software has been the preferred implementation method for the backoff counters. This is due to the fact that the frequent updates to the backoff counters places too great of a computational burden on the processor of a network station when the backoff counters implemented in software.

Unfortunately, a maximum number of different traffic categories have not been specified by the IEEE technical standard. Therefore, a particular implementation with a fixed number of hardware backoff counters cannot be assured of having enough backoff counters to support all of the different traffic categories. Additionally, a large number of hardware backoff counters can be expensive in terms of integrated circuit real estate. A need has therefore arisen for a technique that can support a variable number of different traffic categories without placing an undue computational burden on the processor of a network station.

SUMMARY OF THE INVENTION

In one aspect, the present invention provides a method for contending for access to a communications medium to transmit a message of a first traffic category in a system implementing a plurality of backoff counters using a single hardware backoff counter comprising: determining if the hardware backoff counter is idle, initiating a backoff procedure for the message if the hardware backoff counter is idle, if the hardware backoff counter is busy, then generating a backoff time for the first traffic category, comparing the backoff time for the first traffic category with a backoff time for a second traffic category in the hardware backoff counter; and determining a backoff procedure based on the results of the comparison.

In another aspect, the present invention provides a method for implementing a plurality of backoff counters using a single hardware backoff counter comprising determining a state of the hardware backoff counter, if the hardware backoff counter is performing a backoff procedure, then determining a state of a communications medium, if the communications medium is idle, then decrementing a value in the hardware backoff counter, if the value is equal to zero, then allow transmission to occur, if the communications medium is busy, then updating a value in each backoff counter, selecting a backoff counter with a smallest value, moving the selected backoff counter to the hardware backoff counter; and initiating a new backoff procedure with the hardware backoff counter.

The present invention provides a number of advantages. For example, use of a preferred embodiment of the present invention allows for a variable number of backoff counters while requiring only a single hardware backoff counter, increasing the flexibility of the network station.

Also, use of a preferred embodiment of the present invention requires computational support only when there is not a high demand for compute cycles. A time when there is high demand for computational support would, for example, be while the communications channel is idle. Rather, the updating of the software backoff counters during the time when the communications channel is busy, implying that the hardware backoff counters and any associated processes having to do with contention for the communications channel are idle because the channel is busy and is not available for contention.

Additionally, a preferred embodiment of the present invention allows for backoff counters to be implemented in software, hence permitting changes to be made to the design of the backoff counters by reprogramming the software of the network station.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Long delays leads to communications with large latencies. There are many communications applications that cannot tolerate high network latency. Examples include voice telephony applications, video tele-conferencing, and other real-time, bi-directional and interactive applications. These applications require a network that provides a low maximum network latency, a minimal data transfer rate, and other QoS expectations.

One step devised to meet QoS expectations involves categorizing traffic in the network and assigning QoS parameters and/or priorities to the different traffic categories. Network traffic with the low network latency requirements are assigned higher priorities to ensure that they are serviced before traffic with less stringent network latency requirements, hence the higher priority traffic is required to wait less. Traffic with lower priorities are sometimes required to wait an extended amount of time, but only applications that are not sensitive to extended wait-times are assigned low priorities. Applications such as data and file transfers are assigned low priorities, while applications such as voice and video transmissions are assigned high priorities.

Figure 1:
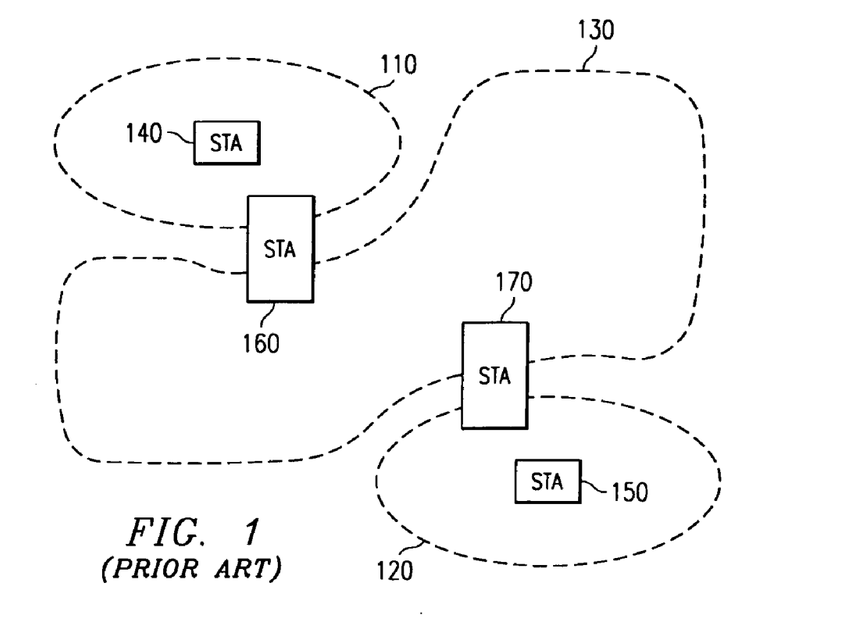
FIG. 1 is a diagram displaying a typical (prior art) configuration of a wireless local area network.

Referring now to FIG. 1, a diagram (prior art) of a typical wireless local area network (LAN) installation according to the IEEE 802.11 technical standard, "ANSI/IEEE Std 802.11,1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set (ESS) 160. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

As shown in FIG. 1, BSS 110 is connected to DS 150 via the access point 130 and the second access point 140 connects BSS 120 to DS 150. It should be noted that an access point also contains a wireless station and can be addressed like any other wireless station.

Stations within a BSS, for example, stations 130 and 170 in BSS 110, may communicate with one another without interfering with stations in other BSSs. However, the stations within a BSS cannot simply communicate whenever they wish; they must follow an established set of rules designed to minimize collisions and maximize performance.

A user may be thought of as a device or an entity that uses a station to communicate with other users who are using other stations to communicate. Therefore, in the remainder of this discussion, the terms stations and users will be used interchangeably without loss of information.

In an IEEE 802.11 wireless LAN, data, management, and control traffic are transmitted in what are called "units." Data and control traffic transmitted between two stations are called Medium Access Control (MAC) protocol data units (MPDU), while management traffic transmitted between two stations are called MAC management protocol data units (MMPDU). A unit may be fragmented if it is too large to fit within a single MAC frame and therefore may be fragmented into multiple MAC frames.

An IEEE 802.11 wireless LAN may transmit information in one of two ways. A first way, called contention free communications, occurs only when a network station receives a poll from a network controller that explicitly gives the network station permission to transmit. A second way, known as contention access, allows any network station to vie for control of the shared communications medium when the medium is determined to be idle. The medium is idle when the clear channel assessment (CCA) has been continuously asserted for an extended period of time.

The method used controlling access to the medium is as follows. When a network station has information to transmit, it places the information in a queue and it generates a random time value known as a backoff time. The backoff time selected from a uniformly distributed random variable with an interval [0, CW], where CW is a value specified in the IEEE 802.11 technical specifications. The backoff time is then placed into a backoff timer. The backoff timer decrements the backoff time by one each time the medium remains idle for one network cycle. When the backoff timer reaches zero, the network station can transmit. If the medium becomes busy when backoff timer is not zero, then the backoff timer stops decrementing.

Because the contention access control method is fully distributed, i.e., any network station with information to transmit is using the access control method, collisions can and do occur. If a collision occurs, then the stations involved in the collision will generate a new backoff time with the interval being doubled in size. This continues until the information is successfully transmitted or if a message has been involved with too many collisions and retransmissions are abandoned.

According to the IEEE 802.11e draft technical standard version 2.0, the contention access control method is extended to support prioritized traffic. The IEEE 802.11e draft technical standard, "Draft Supplement to STANDARD FOR Telecommunications and Information Exchange Between Systems LAN/MAN Specific Requirements—Part 11: Wireless Medium Access Control (MAC) and Physical Layer (PHY) Specifications: Medium Access Control (MAC) Enhancements for Quality of Service (QoS)", which is incorporated herein by reference. The draft technical standard specifies that each category of traffic be required to undergo the contention access control method for access to the shared communications medium.

A common way to provide contention access control for every category of traffic is to provide a queue and backoff timer for each different traffic category. As stated previously, there are two ways to implement the backoff timers, in software and in hardware. Implementing the backoff timers in software provides a large amount of flexibility, both in terms of features and functionality. Because the backoff timers are implemented in software, their design and number can be readily changed when needed. Implementing the backoff timers in hardware reduces the computational load placed on the processor of the network station, but is inflexible because the design and number of backoff timers cannot be changed once set. Because the number of traffic categories may change, a hardware implementation of the backoff timer with an insufficient number of backoff timers to support all of the traffic categories is not a usable solution.

The inflexibility of the hardware backoff counter places severe limitations on its use in an actual network station. However, the implementation of the backoff timers in software can place such a great computation burden on the processor of the network station that it may require a significant processor upgrade. A method that can implement an arbitrary number of backoff timers with a single hardware timer would provide an ideal compromise to the flexibility and cost issues.

Figure 2:
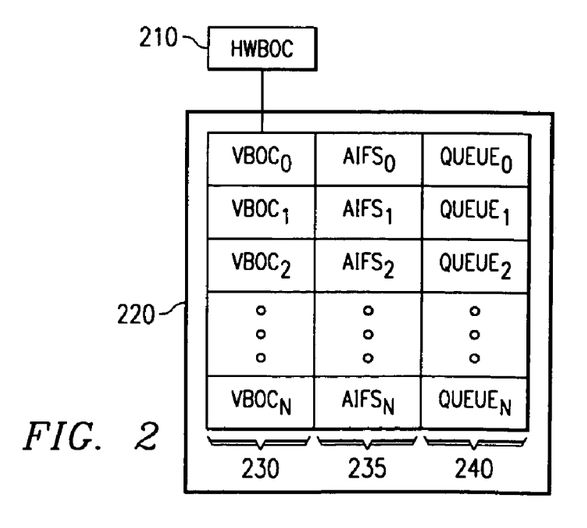
FIG. 2 is a block diagram displaying an implementation of a plurality of backoff counters using a hardware backoff counter according to a preferred embodiment of the present invention.

Referring now to FIG. 2, a diagram displays one possible configuration for supporting an arbitrary number of backoff counters using a single hardware backoff counter according to a preferred embodiment of the present invention. A hardware backoff counter (HWBOC) 210 is coupled to a memory 220. The memory 220 is used to hold a plurality of virtual backoff counter (VBOC) 230, arbitration interframe space (AIFS) 235, and queue groupings 240, one grouping per traffic category. According to a preferred embodiment of the present invention, the memory 220 may be a separate memory expressly dedicated to implementing the VBOC, AIFS, and queue groupings or it may be a portion of a larger block of general purpose memory and the memory space dedicated to implementing the VBOC, AIFS, and queue groupings is only a portion of the general purpose memory.

According to a preferred embodiment of the present invention, the HWBOC 210 is a fully functional backoff counter, meaning that the HWBOC 210 can be loaded with a counter value, it will automatically decrement the value inside it whenever the communications medium is idle for a network cycle, and when it reaches zero, the HWBOC 210 will signal to allow the transmission of information stored in the queue. There are at least two alternate implementations of the HWBOC 210. One implementation of the HWBOC 210 permits the backoff time to be directly written into the HWBOC 210. A second implementation of the HWBOC 210 does not allow the backoff time to be written to the HWBOC 210. Rather, the size of the contention interval ([0, CW]) is specified and the HWBOC 210 randomly selects a value from within the interval. Either type of HWBOC 210 can be used a preferred embodiment of the present invention with full functionality.

According to a preferred embodiment of the present invention, the VBOC is not a fully functional backoff counter. Instead of decrementing the value stored in it after each idle network cycle, the VBOC maintains the value that was initially stored in it. Decrementing the value stored in every VBOC after every idle network cycle would place an undue computational burden on the processing element of the network station and is, in essence, a software implementation of the backoff counter. It is preferred that the VBOC be updated only when the communications medium becomes busy. When the communications medium becomes busy, the HWBOC 210 (and all other backoff counters in the network) stops decrementing and there is some information being transmitted on the medium, either from the current network station or some other network station. When the communications medium is busy, the processing element of the network station updates the values stored in each VBOC.

The HWBOC 210 may be a self-contained timer chip that is implemented in silicon (or some other integrated circuit design technology) that is coupled to the processing element of the network station or it may be a custom designed functional block of the processing element of the network station.

As discussed previously, there are at least two possible configurations for an HWBOC, one configuration allows a direct write of the backoff time to the HWBOC while a second configuration does not allow a direct write of the backoff time to the HWBOC. The present invention is operable with both configurations, with minor adjustments.

Figure 3:
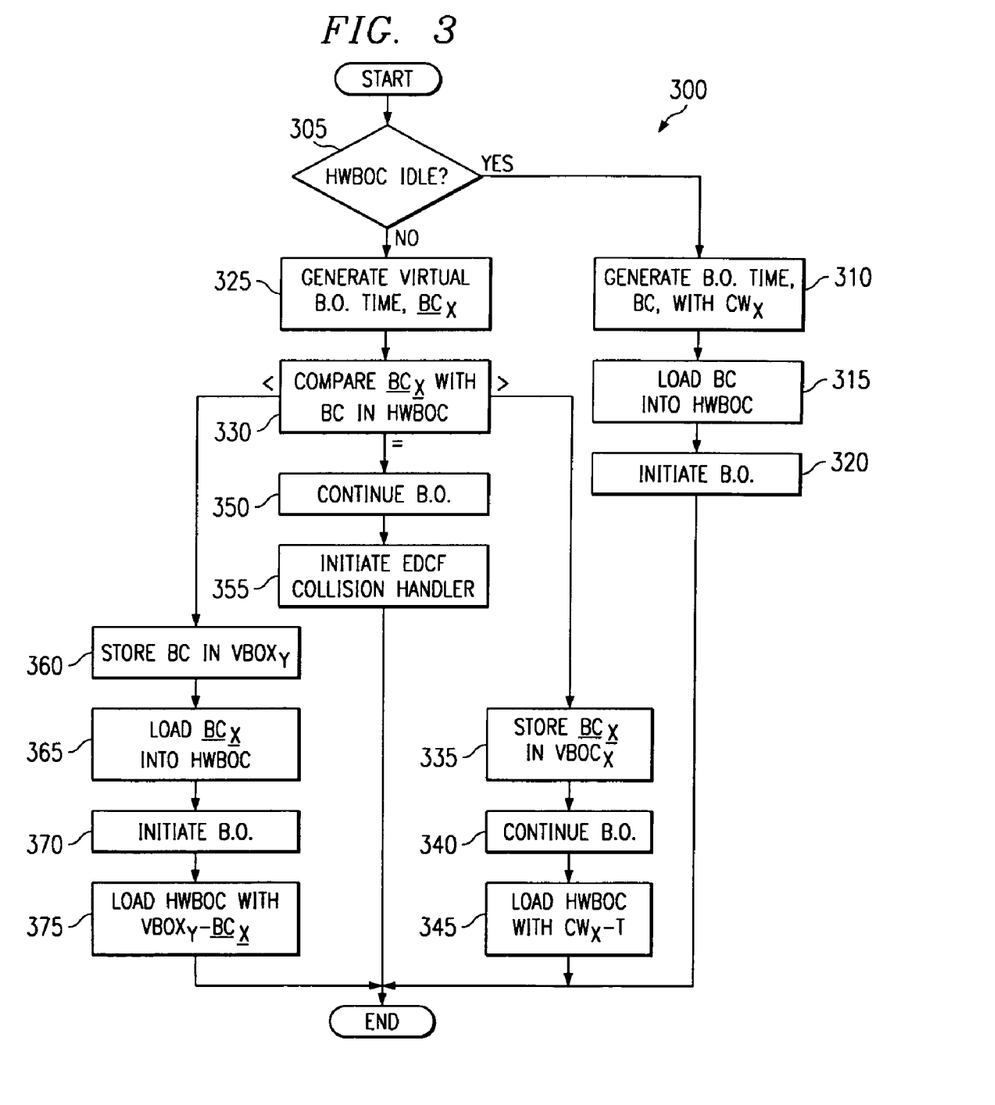
FIG. 3 is a flow diagram displaying an algorithm for implementing a plurality of backoff timers with a single hardware backoff counter that permits direct writes to its countdown register according to a preferred embodiment of the present invention.

Referring now to FIG. 3, a flow diagram illustrates an algorithm 300 for implementing a plurality of backoff timers with a single HWBOC that permits direct writes to its countdown register according to a preferred embodiment of the present invention. For simplicity reasons, FIG. 3 displays the algorithm 300 operating in a network with two traffic categories. The algorithm 300 can be readily extended to a network with an arbitrary number of traffic categories (as will be discussed below). The algorithm 300 is intended for execution on the processing element or controller of the network station. Each network station in the network would be executing a copy of the algorithm 300.

When a particular traffic category, for example, category X, has information to transmit, the network station will store the information in a queue. The network station will then check the HWBOC to see if it is idle (block 305). The HWBOC is idle only when there are no other traffic categories attempting to transmit and all of the queues are empty. If the HWBOC is idle, then the particular traffic category is given immediate access to the HWBOC. The network station will generate a backoff time with a contention window value, $CW_X$, associated with traffic category X (block 310). As discussed previously, the backoff time is a randomly generated value that is selected from an interval [0, $CW_X$]. After the backoff time is generated, the backoff time is written to the HWBOC (block 315) and the backoff is automatically initiated (block 320). When the backoff timer expires, the network station can transmit the information.

If the HWBOC was not idle (block 305), for example, it could be performing a backoff for category Y traffic, then the network station will generate a virtual backoff time associated with traffic category X, $BC_X$ (block 325). As was previously discussed, the virtual backoff time was selected from an interval [0, $CW_X$]. The network station then compares $BC_X$ with the backoff time stored in HWBOC (block 330). There are three possible outcomes to the comparison: $BC_X$ is greater than the backoff time in the HWBOC, $BC_X$ is equal to the backoff time in the HWBOC, or $BC_X$ is less than the backoff time in the HWBOC.

If $BC_X$ is greater than the backoff time in the HWBOC, then the traffic category that currently occupies the HWBOC (category Y) should be allowed to continue. The backoff time, $BC_X$, generated is stored in a VBOC that is associated with the traffic category X, $VBOC_X$ (block 335) and the current backoff timer is allowed to continue (block 340). When the backoff timer expires and the associated queued information has been transmitted, then the backoff time, $BC_X$, currently stored in $VBOC_X$ can be loaded into the HWBOC.

However, since time has elapsed since $BC_X$ was written to $VBOC_X$ and the medium is now busy, it is time to update the value in $VBOC_X$. Let T be the amount of time that was in the HWBOC when $BC_X$ was written to $VBOC_X$, then the updated value of $VBOC_X$ is $BC_X-T$. It is the updated value of $VBOC_X$ that is loaded into the HWBOC and the backoff timer begins to count down for the category X information. Note that we disregard the times when the medium may be busy in the determination of the correct values for the contents of the HWBOC and the VBOCs, this is because while the medium is busy, all backoff counters are frozen.

If $BC_X$ is equal to the backoff time in the HWBOC, then a collision will occur between the transmissions from the two traffic categories. In this case, the backoff procedure is permitted to continue (block 350) and when the backoff timer expires, then an EDCF collision handler will decide which of the two traffic categories is permitted to transmit (block 355). According to IEEE 802.11e draft technical standard, the traffic category with a higher transmission priority will be permitted to transmit while the traffic category with a lower transmission priority will be treated as if it had been involved in a collision and a new backoff time will be selected from an interval that is double the size of the previous interval. The IEEE 802.11e draft technical standard specifies the EDCF collision procedure in detail and the procedure itself, is beyond the scope of the present invention.

If $BC_X$ is less than the backoff time in the HWBOC, then the contention access for the information of category X should granted access to the HWBOC. To do so, the backoff currently in the HWBOC must be switched with the backoff in $VBOC_X$. The backoff time in the HWBOC is stored in $VBOC_Y$, the virtual backoff timer for traffic category Y (block 360) and the backoff time in $VBOC_X$ is loaded into the HWBOC (block 365) and the backoff is started (block 370). After the backoff timer expires and the transmission of the category X information is initiated, the content of $VBO_Y$ is updated. The new value of the backoff time in $VBOC_Y$ is equal to the old backoff time in $VBOC_Y$ minus $BC_X$, or $VBOC_Y=VBOC_Y-BC_X$. This new backoff time for the category Y traffic is loaded into the HWBOC and the backoff for the category Y traffic resumes (block 375).

FIG. 3 displays an algorithm for implementing multiple backoff counters with a single hardware counter when the hardware counter allows direct writes to its countdown register. There are, however, backoff counters that do not allow direct writes to its countdown register. Backoff counters of this type typically operate by having the contention window be specified and it would randomly select a value from within the contention window. The present invention, with a few minor changes, is fully operable with this type of hardware counter.

Figure 4:
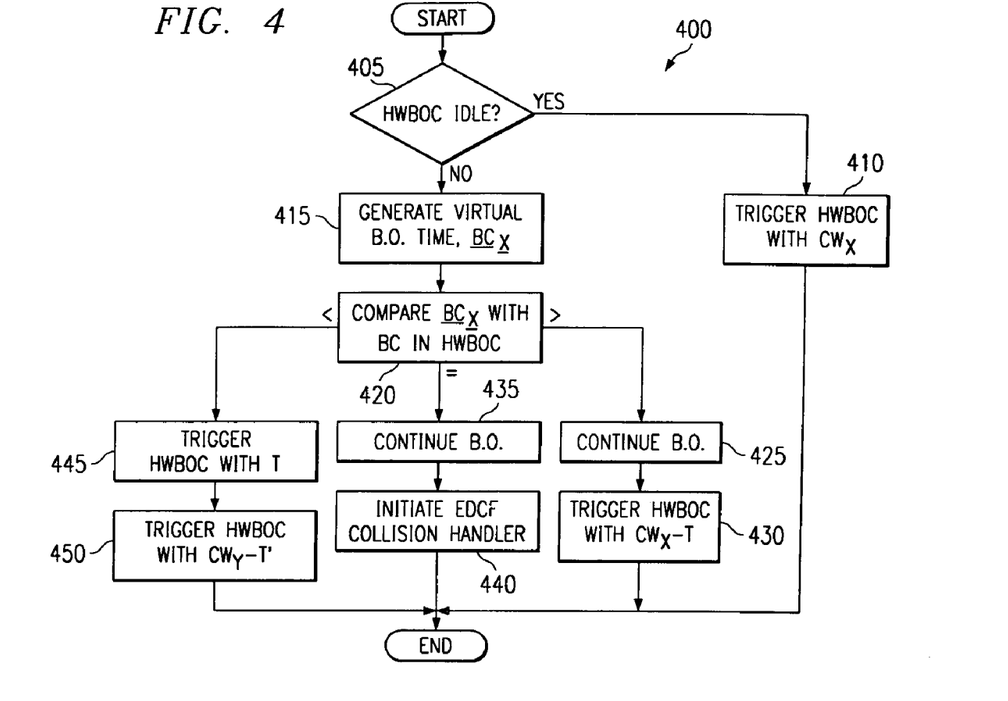
FIG. 4 is a flow diagram displaying an algorithm for implementing a plurality of backoff timers with a single hardware backoff counter that does not permit direct writes to its countdown register according to a preferred embodiment of the present invention.

Referring now to FIG. 4, a flow diagram illustrates an algorithm 400 for implementing a plurality of backoff timers with a single HWBOC that does not allow direct writes to its countdown register according to a preferred embodiment of the present invention. For simplicity reasons, FIG. 4 displays the algorithm 400 operating in a network with two traffic categories. The algorithm 400 can be readily extended to a network with an arbitrary number of traffic categories (as will be discussed below). The algorithm 400 is intended for execution on the processing element or controller of the network station. Each network station in the network would be executing a copy of the algorithm 400.

When a particular traffic category, for example, category X, has information to transmit, the network station will store the information in a queue. The network station will then check the HWBOC to see if it is idle (block 405). The HWBOC is idle only when there are no other traffic categories attempting to transmit. If the HWBOC is idle, then the particular traffic category is given immediate access to the HWBOC. The network station will initiate a backoff procedure by specifying a contention window size, $CW_X$, that is associated with traffic category X (block 410) to the HWBOC. This operation serves to initiate a backoff procedure with a backoff time that lies within the interval [0, $CW_X$]. This specification of an interval size to the HWBOC is sometimes referred to as triggering the HWBOC. When the HWBOC expires, the information is transmitted.

If the HWBOC was not idle (block 405), for example, it could be performing a backoff for category Y traffic, then the network station will generate a virtual backoff time associated with traffic category X, $BC_X$ (block 415). As was previously discussed, the virtual backoff time was selected from an interval [0, $CW_X$]. The network station then compares $BC_X$ with the backoff time stored in HWBOC (block 420). There are three possible outcomes to the comparison: $BC_X$ is greater than the backoff time in the HWBOC, $BC_X$ is equal to the backoff time in the HWBOC, or $BC_X$ is less than the backoff time in the HWBOC.

If $BC_X$ is greater than the backoff time in the HWBOC, then the traffic category that currently occupies the HWBOC should be allowed to continue (block 425). When the backoff timer expires and the associated queued information for category Y traffic has been transmitted, then the category X information may take over the HWBOC.

However, rather than triggering the HWBOC with $CW_X$, compensation must be provided to account for the time consumed by the backoff performed for the category Y traffic. Let T be the amount of time that was spent in the backoff for the category Y traffic after the category X traffic attempted a transmission. Then, the HWBOC will be triggered with an interval of size $CW_X$–T (block 430). Note that the value of $BC_X$ is not stored in $VBOC_X$ like it was in the case when the HWBOC permitted writes to its countdown register. Rather, the generated random value in the HWBOC, is stored in $VBOC_X$.

If $BC_X$ is equal to the backoff time in the HWBOC, then a collision will occur between the transmissions from the two traffic categories. In this case, the backoff procedure is permitted to continue (block 435) and when the backoff timer expires, then an EDCF collision handler will decide which of the two traffic categories is permitted to transmit (block 440). According to IEEE 802.11e draft technical standard, the traffic category with a higher transmission priority will be permitted to transmit while the traffic category with a lower transmission priority will be treated as if it had been involved in a collision and a new backoff time will be selected from an interval that is double the size of the previous interval. The IEEE 802.11e draft technical standard specifies the EDCF collision procedure in detail and the procedure itself, is beyond the scope of the present invention.

If $BC_X$ is less than the backoff time in the HWBOC, then the contention access for the information of category X should granted access to the HWBOC. Let T be the value of the HWBOC, the time remaining before the category Y traffic would have been allowed to transmit. The HWBOC is triggered with the value T (block 445). When the HWBOC expires, the category X traffic is transmitted. After the category X traffic is transmitted, the category Y traffic is allowed to obtain access to the HWBOC. Let T' be the time from when the category Y traffic first had access to the HWBOC to the time when the category X traffic was transmitted. The HWBOC is then triggered with a contention window of size $CW_Y$–T', where $CW_Y$ is the original contention window of the category Y traffic (block 450).

Derivation of the three different cases resulting from the comparison of the virtual backoff time, $BC_X$, with the HWBOC is discussed in greater detail below. The discussion assumes that the HWBOC does not permit direct writes to its countdown register. The significant difference between the writeable and non-writeable HWBOC is that with the writable HWBOC, the HWBOC can be directly written with the VBOC, while with the non-writable HWBOC, the HWBOC must be triggered, i.e., initiated with a random value, with a controlled parameter that is preferably based on the current VBOCs. For a non-writable HWBOC, once the HWBOC is triggered, the generated random value will be save as the VBOC. This random value needs to be saved, but it is preferred that the value be saved when the channel becomes busy or when the traffic category occupying the HWBOC has been displaced from the HWBOC by another traffic category.

According to the IEEE 802.11e technical standard, the uniform distribution of the backoff value for use in contention for access to the shared communications medium is required. The technical standard does not require that the backoff timers be implemented in hardware, software, or a combination thereof. It only requires that the backoff value, however generated and maintained, must be uniformly distributed and must remain so when traffic categories are moved up and down a prioritized list for transmission purposes.

In order to properly implement EDCF with a plurality of VBOCs and a single HWBOC, the uniform distribution of the backoff value for each supported traffic category must be guaranteed. As described previously, the total backoff period for a given traffic category X may be composed of several individual periods. This is due to the chance that a given traffic category may occupy the HWBOC for a period of time and then replaced by a different traffic category with a higher priority and then once again regaining occupancy of the HWBOC. A method, referred to as Multi-stage Uniform Generation (MUG), for generating uniformly distributed random variables is discussed below. The method will show that the summation of these individual periods is indeed uniformly distributed within the interval [0, $CW_X$]. The discussion will also show that the present invention is adherent to the requirements of MUG and, therefore, satisfies the uniform distribution of the backoff values requirement of the IEEE 802.11e technical standard.

The MUG method is as below:

Given two numbers T and CW, where $CW \geq T \geq 0$.

A random variable, BC, uniformly distributed in the interval [0, CW] can be drawn as follows. First, a random variable $BC_1$ is drawn uniformly from the interval [0, CW], i.e., $BC_1 = U[0, CW]$, where U[interval] denotes a uniformly distributed variable drawn from the interval.

If $BC_1 \geq T$, then BC=U[T, CW].

If $BC_1 < T$, then BC=U[0, T].

When drawing BC=U[0, T] or BC=U[T, CW], the MUG method can be repeatedly employed. Therefore, the MUG method can be carried out an arbitrary number of times.

A proof of the MUG method is as follows:

For any given value y,

The probability that $BC = y$, $Pr(BC = y) =$ $Pr(BC = y \mid BC \geq T)Pr(BC \geq T) + Pr(BC = y \mid BC < T)Pr(BC < T) =$ $Pr(BC = y \mid BC \geq T)Pr(BC1 > T) + Pr(BC = y \mid BC < T)$ $Pr(BC1 < T) = I(y \geq T)Pr(BC = y \mid BC \geq T)Pr(BC1 > T) +$ $I(y < T)Pr(BC = y \mid BC < T)Pr(BC1 < T) =$ $I(y \geq T)\frac{1}{CW - T}CW - \frac{T}{CW} + I(y < T)\frac{1}{T}\frac{T}{CW} =$ $(I(y \geq T) + I(y < T))\frac{1}{CW} = \frac{1}{CW}$ where: Pr(BC=y) means the probability of the event BC=y occurring, I(y>T) returns a 1 if $y \geq T$ and a 0 if y<T.

Notice that the present invention follows the MUG method for generating the backoff value for a queue of a given traffic category X. For example, traffic category X first generates a virtual backoff counter $BC_X = U[0, CW_X]$. Then, the generated $BC_X$ is compared with the value in the HWBOC, namely T. If $BC_X$ is smaller than the residual HWBOC value, T, the backoff value of traffic category X is selected from the interval [0, T]. If $BC_X$ is larger than the residual HWBOC value, T, the traffic category will wait a period of T time units and set its backoff value to be U[0, $CW_X$-T]. Therefore, the total backoff value for traffic category X is T+U[0, $CW_X$-T]=U[T, $CW_X$].

In summary, for the two cases ($BC_X$<=T and $BC_X$>T), the actual backoff value for the traffic category X is determined according to the MUG method and is therefore uniformly distributed in the interval [0, $CW_X$].

In the case when there are multiple traffic categories, i.e., multiple VBOCs active, the present invention also applies. For example, when a packet from a traffic category occupying the HWBOC finishes transmitting, a decision has to be made on the next traffic category to occupy the HWBOC. Assume the virtual backoff counters (VBOCs) are sorted in the increasing order, i.e., $VBOC_X$<$VBOC_Y$< ... <$VBOC_Z$.

According to a preferred embodiment of the present invention, the actual backoff value for the traffic category X should be less than the second smallest VBOC, i.e., $VBOC_Y$ (T in the MUG method) but larger than the time it has already backed off, for example, C. Therefore, the backoff value for the traffic category X should be set to U[C, $VBOC_Y$] or expressed alternatively as C+U[0, $VBOC_Y$-C]. Hence, the HWBOC will be triggered using $VBOC_Y$-C for traffic category X.

Figure 5A:
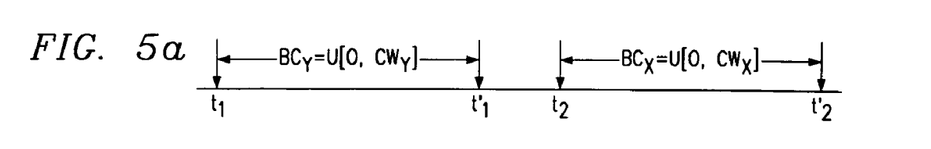
FIG. 5*a–d* are timing diagrams displaying sequences of events used in derivation of the algorithms for implementing a plurality of backoff counters on a hardware backoff counter according to a preferred embodiment of the present invention.

Referring now to FIG. 5a, a timing diagram displays a set of events used in the derivation of the algorithm for implementing multiple backoff counters on a single hardware backoff counter when the hardware backoff counter is idle according to a preferred embodiment of the present invention. Since the HWBOC is idle, there are no other traffic categories in the network station attempting to obtain access to the communications medium. The network station is free then to immediately load the HWBOC with a countdown value and begin the backoff procedure. The network station triggers the HWBOC with the appropriate contention window size, [0, $CW_X$].

Figure 5B:
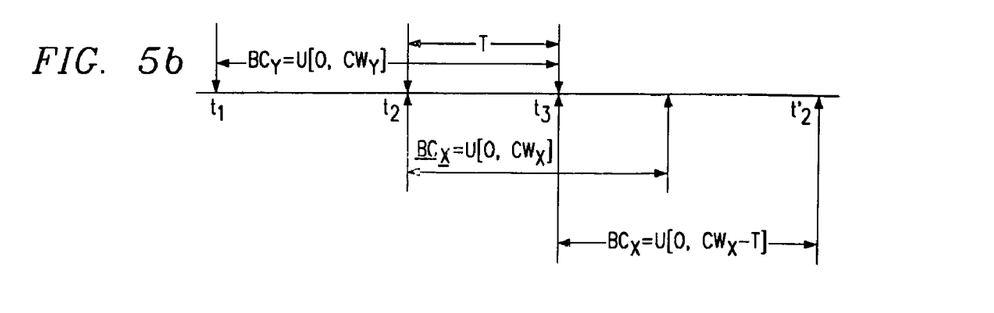

Referring now to FIG. 5b, a timing diagram displays a set of events used in the derivation of the algorithm for implementing multiple backoff counters on a single hardware backoff counter when the hardware backoff counter is busy and the virtual backoff counter is greater than the value in the HWBOC according to a preferred embodiment of the present invention. Assume that at time $t_1$, traffic category Y was given control of the HWBOC and initiated a backoff procedure with a contention window of size [0, $CW_Y$]. Then at time $t_2$, traffic category X desires to transmit. It generates a virtual backoff time, $BC_X$. The network station compares $BC_X$ with the value currently in HWBOC and finds that $BC_X$ is greater than the value in HWBOC. Since the backoff time for category X is greater than the backoff time for category Y, then category Y is permitted to remain in the HWBOC. At time $t_3$, the HWBOC expires and the category Y traffic is permitted to transmit.

Now, category X is allowed to take control of the HWBOC. However, rather than triggering the HWBOC with $CW_X$, which would result in an erroneous backoff time because the backoff time would not be uniformly distributed within [0, $CW_X$], the HWBOC is triggered with $CW_X$-T, where T is equal to $t_3$-$t_2$, or the amount of time that category X traffic has already waited. At time $t'_2$, the HWBOC expires and the category X traffic is allowed to transmit.

Figure 5C:
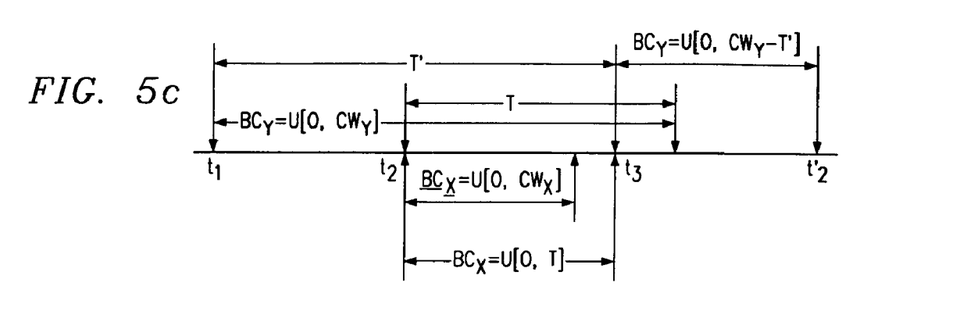

Referring now to FIG. 5c, a timing diagram displays a set of events used in the derivation of the algorithm for implementing multiple backoff counters on a single hardware backoff counter when the hardware backoff counter is busy and the virtual backoff counter is equal to the value in the HWBOC according to a preferred embodiment of the present invention. Assume that at time $t_1$, traffic category Y was given control of the HWBOC and initiated a backoff procedure with a contention window of size [0, $CW_Y$]. Then at time $t_2$, traffic category X had some information to transmit. It generates a virtual backoff time, $BC_X$. The network station compares $BC_X$ with the value currently in HWBOC and finds that $BC_X$ is equal to the value in HWBOC. Since the two backoff times are equal, a collision will occur. The HWBOC is allowed to continue until it expires and an EDCF collision procedure is initiated when the HWBOC expires.

The EDCF collision procedure, as is specified by the IEEE 802.11e draft technical standard, specifies that the traffic category with the higher priority is allowed to transmit. The traffic category with the lower priority is forced to repeat the backoff procedure. However, rather than using the original contention window size, the contention window of the repeated backoff procedure is now double the size of the previous contention window. Should another collision occur, the contention window is doubled once again. This continues until the traffic is successfully transmitted or if a preset number of attempts has been reached and the transmission is aborted. Note that a limit to the doubling of the contention window size is specified in the draft technical standards.

Figure 5D:
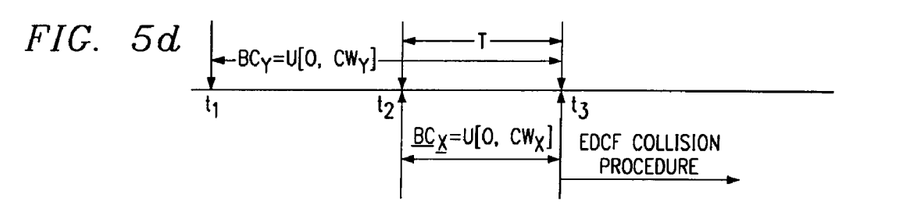

Referring now to FIG. 5d, a timing diagram displays a set of events used in the derivation of the algorithm for implementing multiple backoff counters on a single hardware backoff counter when the hardware backoff counter is busy and the virtual backoff counter is less than the value in the HWBOC according to a preferred embodiment of the present invention. Assume that at time $t_1$, traffic category Y was given control of the HWBOC and initiated a backoff procedure with a contention window of size [0, $CW_Y$]. Then at time $t_2$, traffic category X desires to transmit. It generates a virtual backoff time, $BC_X$. The network station compares $BC_X$ with the value currently in HWBOC and finds that $BC_X$ is less than the value in the HWBOC. Since the virtual backoff time, $BC_X$ is less than the value in the HWBOC, the category X traffic is permitted to take control of the HWBOC.

To ensure that the backoff times remain uniformly distributed, when the category X traffic takes over the HWBOC, the HWBOC is triggered with a contention window of size [0, T], where T is the amount of time remaining in the HWBOC for category Y traffic. When the HWBOC expires, the category X traffic is allowed to transmit. After the category X traffic transmits, the category Y traffic is allowed to resume control of the HWBOC. The category Y traffic triggers the HWBOC with a contention window of size [0, $CW_Y$-T'], where $CW_Y$ is the original contention window size of the category Y traffic and T' is the time difference between $t_1$ and when the category X traffic transmitted, $t_3$.

Up to this point, the algorithms presented have used two different traffic categories. The extension of the algorithms to an arbitrary number of traffic categories is quite similar to the two category cases presented above. When an arbitrary traffic category I requires backoff, it generates a virtual backoff count, $BC_I$, where $BC_I$=U[0, $CW_I$]. The virtual backoff count, $BC_I$, is then compared with the value in the HWBOC. Depending on the results of the comparison, the category I traffic may take over control of the HWBOC. Regardless of which traffic category transmits at a time $t_3$, for example, when the HWBOC reaches zero, each queue not transmitting has its virtual backoff counter updated by deducting the backoff time elapsed.

The various backoff counters are checked to determine the backoff counter with the smallest backoff value and the traffic category associated with the smallest backoff value is allowed to take over the HWBOC with the HWBOC triggered with the second smallest backoff value. This process continues until all queued traffic has been transmitted.

Figure 6:
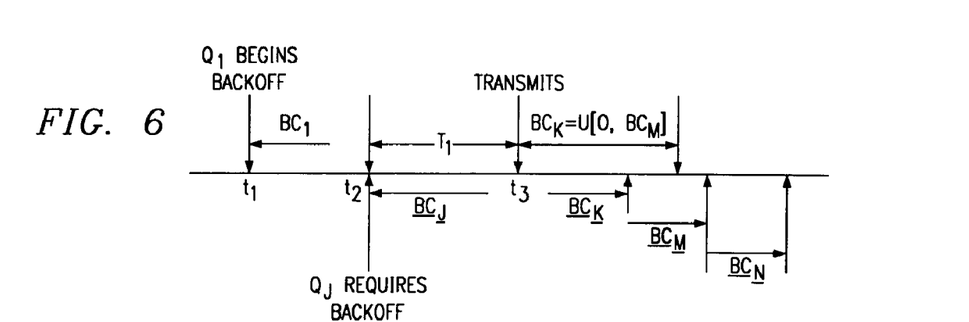
FIG. 6 is a timing diagram displaying a case when the communications network supports more than two traffic categories according to a preferred embodiment of the present invention.

Referring now to FIG. 6, a timing diagram displays a set of events for a communications network with multiple queues according to a preferred embodiment of the present invention. A first traffic category I begins a backoff procedure at time $t_1$ and at time $t_2$, a second traffic category J requires backoff. The network station generates a virtual backoff time for traffic category J, $BC_J$, and compares $BC_J$ with the time remaining in the HWBOC. Regardless of the result of the comparison, at time $t_3$, one of the two traffic categories transmits.

After the transmission is initiated, all remaining virtual backoff counters are updated and then checked to determine the smallest ($BC_K$) and second smallest ($BC_M$) backoff times. The traffic category with the smallest backoff time is permitted to control the HWBOC. The traffic category with the smallest backoff time is moved to the HWBOC and the HWBOC is preferably triggered with a contention window equal in size to the second smallest backoff time. This continues until all queues are cleared.

Another feature specified by the IEEE 802.11e draft technical standard is the use of Arbitration Interframe Space (AIFS). AIFS are used to specify the amount of time that a particular traffic category must wait after the communications medium becomes idle before it can start or resume its backoff countdown. AIFS may be the same for all traffic categories in the network or they may be different for different traffic categories. The present invention is fully functional with either fixed sized AIFS or variable sized AIFS.

Figure 7:
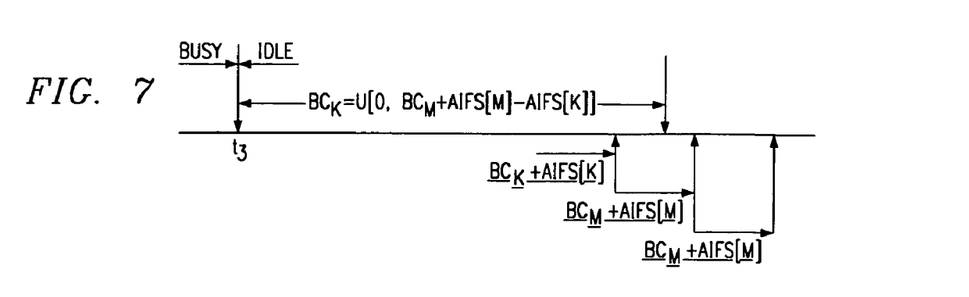
FIG. 7 is a timing diagram displaying a case when the traffic categories have different arbitration interframe space times according to a preferred embodiment of the present invention.

Referring now to FIG. 7, a timing diagram displays a set of events for a communications network with variable sized AIFS according to a preferred embodiment of the present invention. In the case when the AIFS are all fixed, their net effect can be ignored because they effectively cancel each other out. However, when the AIFS are variable in size, they must be considered in determining the size of the backoff counters and the size of the contention window.

Time $t_3$ in FIG. 7 is identical to time $t_3$ in FIG. 6 and represents the expiration of a backoff procedure in the HWBOC and the transmission of information from a corresponding traffic category. In the selection of the smallest backoff time, each traffic category's AIFS must be added. Once the smallest backoff time has been determined and the corresponding traffic category selected, the HWBOC is triggered with a contention window of size equal to the second smallest backoff time plus the AIFS of the traffic category with the second smallest backoff time minus the AIFS of the traffic category with the smallest backoff time.

A hardware implementation of a preferred embodiment of the present invention has minimal requirements above and beyond a hardware implementation of a single hardware backoff counter implementation required for network stations compliant with the IEEE 802.11b technical standard, a standard that supports only a single backoff counter and does not support multiple traffic categories and priorities.

Figure 8:
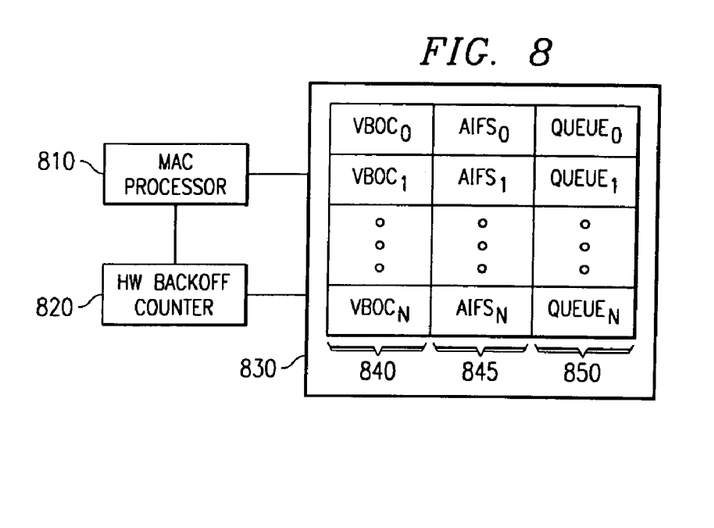
FIG. 8 is a block diagram displaying a circuit featuring a hardware backoff counter being used to implement a plurality of backoff counters according to a preferred embodiment of the present invention.

Referring now to FIG. 8, a block diagram displays an implementation of multiple backoff counter support using a single hardware backoff counter according to a preferred embodiment of the present invention. A medium access control (MAC) processor 810 provides the processing power for the network station. The MAC processor 810 is responsible for executing firmware tasks that control the operation of the network station, including but not limited to: coding and decoding transmissions, controlling medium access by executing medium access algorithms such as the contention access and contention-free access algorithms, recovery from transmission collisions, etc. The MAC processor may be a general purpose microprocessor, a custom designed special purpose microprocessor, a micro-controller, or any processor with sufficient processing power to perform the functions required.

Coupled to the MAC processor 810 is a hardware backoff counter (HWBOC) 820. The HWBOC 820 is a counter that, when loaded with a backoff time, will decrement the time by one each time the communications medium remains idle for a network cycle. If the medium is busy, the HWBOC 820 does not decrement the backoff time. According to the IEEE 802.11e draft technical standard, several parameters, such as the AIFS, can change the behavior of the HWBOC 820. For example, if there is a value for the AIFS, then the HWBOC 820 much wait for that many network cycles to expire after the medium becomes idle before it can begin decrementing. The HWBOC 820 may contain circuitry to automatically determine when the medium is idle or busy. Alternatively, specialized external circuitry (not shown) may be present in the network station that will notify the HWBOC 820 of the status of the medium via asserting a value on a signal flag line, asserting an interrupt, or changing a value in a memory location or register.

A memory 830 coupled to both the MAC processor 810 and the HWBOC 820 is used to maintain information regarding the virtual backoff counters and queue the information to be transmitted. The memory 830 may be a stand-alone memory or it may be a portion of a larger memory block that is a part of the network station. According to a preferred embodiment of the present invention, for each traffic category, the memory 830 will maintain a virtual backoff counter (VBOC) 840, an arbitration interframe space (AIFS) 845, and a queue 850. The queue should be sized to hold a sufficient amount of information to be transmitted. The VBOC is used to store the backoff counter time for the corresponding traffic category, while the AIFS maintains the AIFS for the corresponding traffic category. The queue is used to store information that is ready for transmission but is waiting for access to the communications medium.

Figure 9:
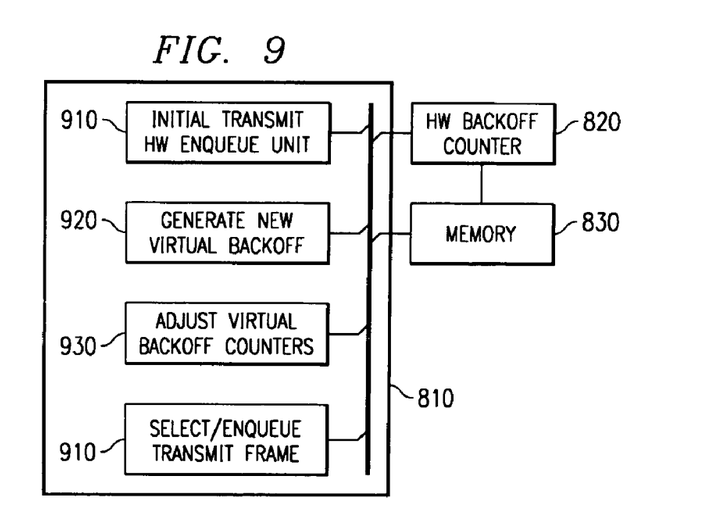
FIG. 9 is a block diagram displaying a processor supporting a plurality of backoff counters with a hardware backoff counter in greater detail according to a preferred embodiment of the present invention.

Referring now to FIG. 9, a diagram provides a detailed view of the MAC processor 810 according to a preferred embodiment of the present invention. The MAC processor 810 contains several functional units that are expressly present to provide support for the implementation of multiple backoff timers using a single hardware backoff timer. According to a preferred embodiment of the present invention, the functional units may be implemented as programs and subroutines executing within the memory space of the MAC processor 810 or the functional units may be custom design hardware, implemented in silicon within the MAC processor 810 or the functional units may be implemented in firmware residing in the MAC processor 810.

A first functional unit is an initial transmit hardware enqueue unit 910. The initial transmit unit 910 is responsible for accepting a transmission request. When the initial transmit unit 910 receives a transmission request, it will initially check the status of the communications medium. If the medium is idle, then the transmission request is immediately forwarded to the HWBOC 820 where a backoff time will be generated and the transmission will occur when the HWBOC 820 expires. If the medium is busy and the HWBOC 820 is idle, then the transmission request is forwarded to the HWBOC 820 where a backoff time will be generated and the transmission will occur when the HWBOC 820 expires. If the HWBOC 820 is busy, then the initial transmit unit 910 forwards the request to a generate virtual backoff unit 920.

The generate virtual backoff unit 920 is used to place the transmission request into a queue corresponding to the traffic category that corresponds to the transmission request. The generate virtual backoff unit 920 is also responsible for generating a virtual backoff time for the transmission request and will place the time into the queue's virtual backoff counter.

Each time that the communications medium becomes busy, the backoff counters are frozen, providing a good opportunity to update the virtual backoff counters. An adjust virtual backoff counters unit 930 is responsible for updating the virtual backoff counters. To do so, the adjust virtual backoff counter unit 930 will read the counter in the HWBOC 820 and use the read value to determine the number of network cycles the medium had been idle.

The number of idle network cycles minus the value of AIFS for the traffic category in the HWBOC 820 is subtracted from each virtual backoff counter.

Finally, after the traffic category in the HWBOC 820 is finally able to transmit and the virtual backoff counters have been updated, a new transmission must be selected from the queues and placed in the HWBOC 820. A select and enqueue transmit frame unit 940 is responsible for selecting the next occupant of the HWBOC 820. The select and enqueue transmit frame unit 940 examines all of the virtual backoff counters to determine the one with the lowest backoff time, including the AIFS associated with each traffic category. The traffic category with the lowest virtual backoff time is selected and placed in the HWBOC 820.

If the HWBOC 820 is occupied, which is possible if the medium becomes busy due to a transmission from some other network station, then the select and enqueue transmit frame unit 940 will also consider the backoff time currently in the HWBOC 820 in its selection process.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for contending for access to a communications medium to transmit a message of a first traffic category in a system implementing a plurality of backoff counters using a single hardware backoff counter wherein each traffic category has a virtual backoff counter, said method comprising:
   (1) determining if the hardware backoff counter is idle;
   (2) initiating a backoff procedure for the message if the hardware backoff counter is idle;
   (3) if the hardware backoff counter is busy, then:
      generating a backoff time for the first traffic category;
      comparing the backoff time for the first traffic category with a backoff time for a second traffic category in the hardware backoff counter; and
      determining a backoff procedure based on the results of the comparison, wherein the hardware backoff counter is a single hardware backoff counter;
   (4) if the communications medium is busy, then:
      updating the values in each virtual backoff counter;
      selecting a message from a traffic category with a smallest backoff counter;
      initiating a backoff procedure based on the selected the traffic category with the smallest backoff counter.

2. The method of claim 1, further comprising the step of (5) repeating steps (1)–(4).

3. The method of claim 1, wherein the updating step occurs when the communications medium is busy.

4. The method of claim 1, wherein the second determining step comprising:
   if the backoff time for the first traffic category is greater than the backoff time in the hardware backoff timer, then:
      waiting until the hardware backoff counter expires; and
      initiating a new first backoff procedure for the first traffic category;
   if the backoff time for the first traffic category is equal to the backoff time in the hardware backoff timer, then:
      waiting until the hardware backoff counter expires; and
      initiating an enhanced distributed coordinating function (EDCF) collision procedure;
   if the backoff time for the first traffic category is less than the backoff time in the hardware backoff timer, then:
      saving the contents of the hardware backoff counter; and
      initiating a new second backoff procedure for the first traffic category.

5. The method of claim 4, wherein the step of initiating the new first backoff procedure for the first traffic category comprising:
   determining a backoff time for the first traffic category;
   loading the backoff time into the hardware backoff counter; and
   starting the hardware backoff counter.

6. The method of claim 5, wherein the backoff time is equal to the generated backoff time for the first traffic category minus the waiting time for the hardware backoff counter to expire while second traffic category occupies the hardware backoff counter.

7. The method of claim 4, wherein the step of initiating the new first backoff procedure for the first traffic category comprising:
   determining a contention window size for the first traffic category;
   loading the contention window size into the hardware backoff counter; and
   starting the hardware backoff counter.

8. The method of claim 7, wherein the contention window size is equal to the generated backoff time for the first traffic category minus the waiting time for the hardware backoff counter to expire while second traffic category occupies the hardware backoff counter.

9. The method of claim 4, wherein the EDCF collision procedure comprising:
   selecting a traffic category of higher priority from the group comprising the first and the second traffic categories;
   allowing the selected traffic category to transmit; and
   generating a new backoff procedure for the unselected traffic category with a contention window doubled in size.

10. The method of claim 4, wherein the step of initiating the new second backoff procedure for the first traffic category comprising:
 determining a backoff time for the first traffic category;
 loading the backoff time into the hardware backoff counter; and
 starting the hardware backoff counter.

11. The method of claim 10, wherein the backoff time is equal to generated backoff time for the first traffic category.

12. The method of claim 4, wherein the step of initiating the new first backoff procedure for the first traffic category comprising:
 determining a contention window size for the first traffic category;
 loading the contention window size into the hardware backoff counter; and
 starting the hardware backoff counter.

13. The method of claim 12, wherein the contention window size is equal the backoff time for the second traffic category.

14. The method of claim 4 further comprising the step of selecting a next traffic category to occupy the hardware backoff counter.

15. The method of claim 14, wherein a backoff counter value is stored for each traffic category, and the selecting step comprising:
 selecting the traffic category with the backoff counter value that is smallest; and
 initiating a backoff procedure for the selected traffic category.

16. The method of claim 15, wherein the step of initiating the backoff procedure comprises loading the hardware counter with a backoff time that is equal to the backoff counter value that is second smallest in size.

17. The method of claim 15, wherein the step of initiating the backoff procedure comprises loading the hardware backoff counter with a contention window of size equal to the backoff counter value that is second smallest in size.

18. The method of claim 17, wherein if the selected traffic category is the only traffic category with a non-zero backoff counter value, then the hardware backoff counter is loaded with contention window of size equal to the backoff counter value of the selected traffic category.

19. The method of claim 4, wherein the step of saving the contents of the hardware backoff counter comprises saving the backoff timer and the message to a backoff timer for the traffic category corresponding to the message in the hardware backoff timer.

20. The method of claim 4, wherein the backoff times for each traffic category include the arbitration interframe space (AIFS) time associated with each traffic category.

21. A method for implementing a plurality of backoff counters using a single hardware backoff counter comprising:
 determining a state of the hardware backoff counter;
 if the hardware backoff counter is performing a backoff procedure, then:
  determining a state of a communications medium;
  if the communications medium is idle, then decrementing a value in the hardware backoff counter;
   if the value is equal to zero, then allow transmission to occur;
  if the communications medium is busy, then updating a value in each backoff counter;
   selecting a backoff counter with a smallest value;
   moving the selected backoff counter to the hardware backoff counter; and
   initiating a new backoff procedure with the hardware backoff counter.

22. The method of claim 21, wherein the decrementing step comprises decrementing the value in the hardware backoff counter only if the communications medium has been idle a period of time at least equal to an arbitration interframe space (AIFS) and the communications medium has been idle for a network cycle since the last time it was decremented.

23. The method of claim 22, wherein there are a plurality of traffic categories, and wherein each traffic category may have a different value for the AIFS.

24. The method of claim 21, further comprising the step of repeating until stopped.

25. The method of claim 21, wherein the updating step comprises:
 determining a period of time between a start of the backoff procedure currently in the hardware backoff counter and a current time; and
 subtracting the period of time from each backoff counter.

26. The method of claim 25, wherein the backoff counter is set to zero if the subtraction produces a result that is negative.

27. The method of claim 21, wherein there are a plurality of traffic categories and each traffic category has a backoff counter, and wherein the moving step comprises:
 moving a backoff counter value and a message from the hardware backoff counter to a
 backoff counter for the traffic category of the message in the hardware backoff counter; and
 moving a backoff counter value and a message from the selected backoff counter to the hardware backoff counter.

28. The method of claim 27, wherein if the selected backoff counter is the hardware backoff counter, then the moving step does not actually move any counter values and messages.

29. The method of claim 21, wherein the selecting step selects the backoff counter with the smallest backoff counter from all backoff counters, including the hardware backoff counter.

30. The method of claim 21, wherein the initiating step comprises:
 determining a backoff time; and
 starting the backoff timer.

31. The method of claim 30, wherein the backoff time is equal to the backoff timer value plus an arbitration interframe space of the selected backoff timer.

32. The method of claim 30, wherein the backoff time is specified by a contention window of a size equal to the backoff timer value of a traffic category with a second smallest backoff timer value plus an arbitration interframe space of the selected backoff timer.

33. The method of claim 32, wherein the contention window is provided to the hardware backoff timer and the hardware backoff timer randomly selects a backoff time from within an interval specified by the contention window.

34. A circuit for implementing a plurality of backoff counters on a hardware backoff counter comprising:
 a hardware backoff counter containing circuitry to decrement a backoff time once for each idle network cycle;
 a memory coupled to the hardware backoff counter, the memory containing storage locations that contain a virtual backoff counter, an arbitration interframe space, and a information queue for each backoff counter; and a processor coupled to the hardware backoff counter and the memory, the processor containing circuitry to implement a plurality of backoff counters on a hardware backoff counter, the processor comprising:

an initial transmit hardware enqueue unit coupled to the hardware backoff counter, the initial transmit hardware enqueue unit containing circuitry to forward a transmission request to the hardware backoff counter depending on the status of the hardware backoff counter;

a generate new virtual backoff unit coupled to the initital transmit hardware enqueue unit and the memory, the generate new virtual backoff unit containing circuitry to generate virtual backoff times and to place the transmission request forwarded to it by the initial transmit hardware enqueue unit onto a queue;

an adjust virtual backoff counters unit coupled to the memory and the hardware backoff counter, the adjust virtual backoff counters unit containing circuitry to adjust the backoff times in the virtual backoff counters; and a select and enqueue transmit frame unit coupled to the memory and the hardware backoff counter, the select and enqueue frame unit containing circuitry to select a transmission request with the lowest backoff time and to place it in the hardware backoff counter.

35. The circuit of claim 34, wherein the hardware backoff counter permits direct writes to its backoff counter.

36. The circuit of claim 34, wherein the hardware backoff counter permits specification of a contention window size.

37. A network station comprising a circuit for implementing a plurality of backoff counters on a hardware backoff counter, the circuit comprising:

a hardware backoff counter containing circuitry to decrement a backoff time once for each idle network cycle;

a memory coupled to the hardware backoff counter, the memory containing storage locations that contain a virtual backoff counter, an arbitration interframe space, and a information queue for each backoff counter; and a processor coupled to the hardware backoff counter and the memory, the processor containing circuitry to implement a plurality of backoff counters on a hardware backoff counter, the processor comprising:

an initial transmit hardware enqueue unit coupled to the hardware backoff counter, the initial transmit hardware enqueue unit containing circuitry to forward a transmission request to the hardware backoff counter depending on the status of the hardware backoff counter;

a generate new virtual backoff unit coupled to the initital transmit hardware enqueue unit and the memory, the generate new virtual backoff unit containing circuitry to generate virtual backoff times and to place the transmission request forwarded to it by the initial transmit hardware enqueue unit onto a queue;

an adjust virtual backoff counters unit coupled to the memory and the hardware backoff counter, the adjust virtual backoff counters unit containing circuitry to adjust the backoff times in the virtual backoff counters; and a select and enqueue transmit frame unit coupled to the coupled to the memory and the hardware backoff counter, the select and enqueue frame unit containing circuitry to select a transmission request with the lowest backoff time and to place it in the hardware backoff counter.

38. The network station of claim 37, wherein the network station is part of a wireless communications network.

39. The network station of claim 37, wherein the network station is part of a hybrid wireless and wired communications network.

* * * * *